United States Patent
Kulkarni

(10) Patent No.: US 7,830,791 B2
(45) Date of Patent: Nov. 9, 2010

(54) METHOD AND SYSTEM FOR ROUTING NETWORK COMMUNICATIONS

(75) Inventor: Amit Bhavanishankar Kulkarni, Clifton Park, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 851 days.

(21) Appl. No.: 11/441,181

(22) Filed: May 26, 2006

(65) Prior Publication Data
US 2007/0274219 A1    Nov. 29, 2007

(51) Int. Cl.
G01R 31/08     (2006.01)
H04J 1/16      (2006.01)
H04J 3/14      (2006.01)
H04L 1/00      (2006.01)
H04L 12/26     (2006.01)

(52) U.S. Cl. ............... 370/229; 370/230; 370/236; 370/236.2; 370/236.1

(58) Field of Classification Search ........... 370/229, 370/230, 230.1, 231, 232, 233, 234, 235, 370/235.1, 236, 236.1, 236.2, 237, 238, 238.1, 370/239, 240

See application file for complete search history.

(56) References Cited

U.S. PATENT DOCUMENTS
6,487,172 B1 * 11/2002 Zonoun ............... 370/238

OTHER PUBLICATIONS

Fedyk, "Multiple Metrics for Traffic Engineering with IS-IS and OSPF", Nov. 2000, IETF, all pages.*
Kulkarni, "Implementation of a Prototype Active Network", 1998, IEEE, all pages.*
Kulkarni, Active Networking Services for Wired/Wireless Networks, 1999, IEEE, pp. 1116-1123.*
Kulkarni, Implementation of a Prototype Active Network, 1998, IEEE, pp. 130-143.*

* cited by examiner

*Primary Examiner*—Kwang B Yao
*Assistant Examiner*—Adam Duda
(74) *Attorney, Agent, or Firm*—Stephen T. Neal; Prass LLP

(57) ABSTRACT

A method and system of routing information packets through a network is presented. The method may include receiving an information packet at a node in a network, wherein the information packet contains information relating to a new metric, forming a new routing protocol based on the new metric information contained in the information packet, and implementing the new routing protocol on the node, wherein the new routing protocol computes routing information based on the new metric information.

20 Claims, 4 Drawing Sheets

METHOD AND SYSTEM FOR ROUTING NETWORK COMMUNICATIONS

BACKGROUND OF THE INVENTION

Routers in networks use routing protocols to communicate with other routers and to determine the best pathway for a given packet of information. Routing protocols make this determination based on specific metrics of each information packet being sent on the network. Examples of these information packet metrics include, but are not limited to, the hop-count, the latency, and the bandwidth capacity. Typically, routing protocols determine the best route for a given information packet based on only one metric. However, because the types of information packets are constantly evolving and changing, the "one-size-fits-all" strategy used by routing protocols for all application packets may result in degraded routing efficiency.

Previous attempts have been made to overcome the inefficiencies resulting from basing routing protocols on only one metric. For example, vendors provide network administrators with multiple metrics to choose from when installing and instantiating a routing protocol. The network administrator then chooses a metric that maximizes the routing efficiency to the largest amount of information packets. However, this results in degraded efficiency for many information packets that are not benefited by the use of a single metric. For example, the protocol used for efficiently routing a voice file may not be the most efficient protocol to use for routing a video file.

Accordingly, there is a need in the art for a method that allows routing protocols to determine the pathway for a given information packet by simultaneously computing multiple metrics of that information packet. There is also a need for a method that allows different routing protocols to be implemented for different types of data. Further, there is a need for a routing protocol that can install and incorporate new metrics for computing the best route for information packets.

SUMMARY OF THE INVENTION

A method and system of routing information packets through a network is presented. The method may include receiving an information packet at a node in a network, wherein the information packet contains information relating to a new metric, forming a new routing protocol based on the new metric information contained in the information packet, and implementing the new routing protocol on the node, wherein the new routing protocol computes routing information based on the new metric information.

DETAILED DESCRIPTION OF THE EMBODIMENTS

The invention is directed towards disseminating one or more network node metrics or links in a network. More specifically, a method of inserting and/or modifying data relating to new metric into an information packet is disclosed. Many networks split up data being sent over a network into packets.

Figure 1:
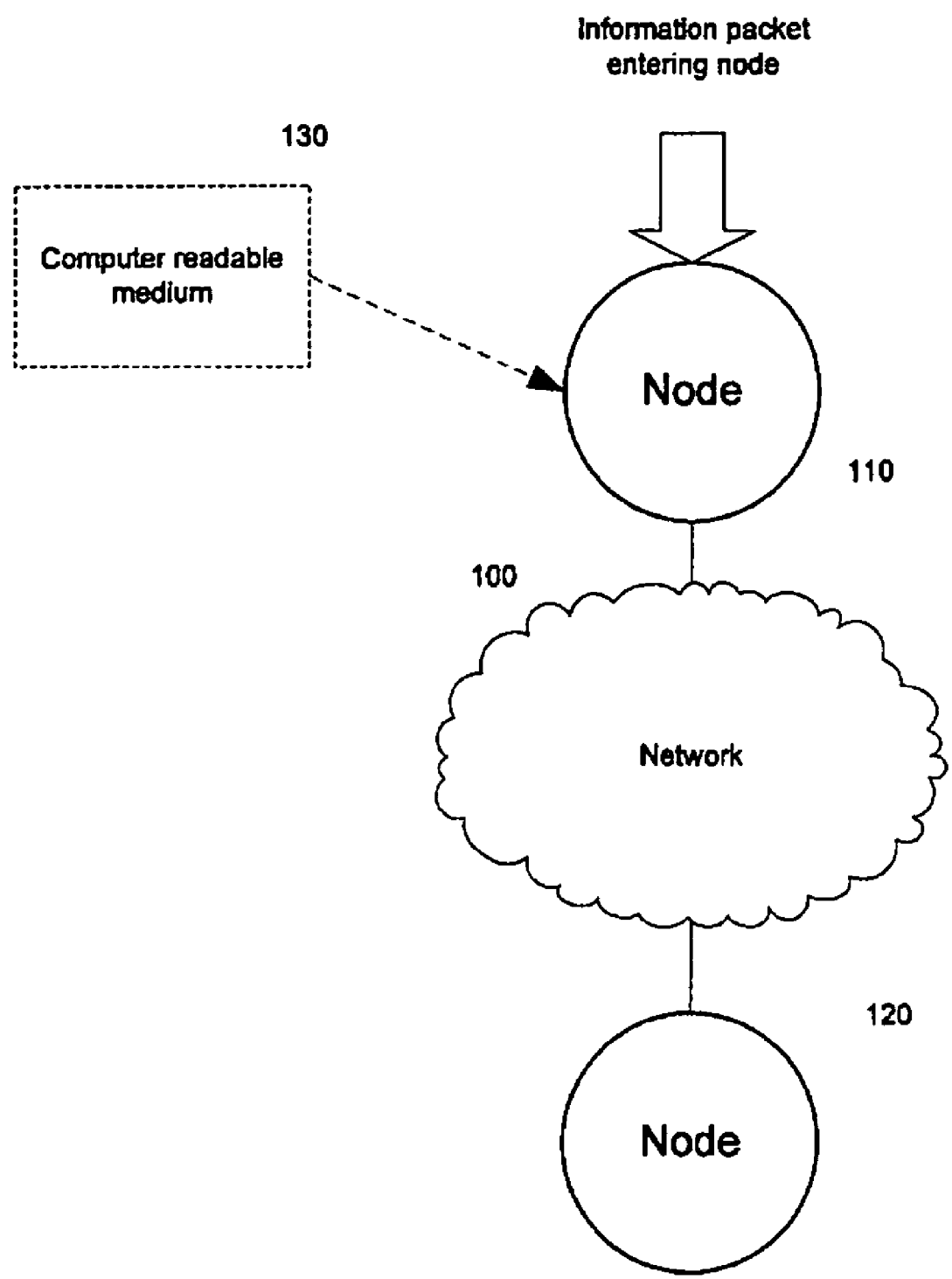
FIG. 1 is a block diagram which illustrates an exemplary network in accordance with a possible embodiment of the invention.

FIG. 1 shows an exemplary network diagram that may include network 100 and a plurality of nodes 110, 120. Although FIG. 1 shows two nodes 110, 120, the network 100 may have only one node, or any number of nodes. As shown at the top of FIG. 1, an information packet enters one of the nodes 110 in the network 100.

Figure 2:
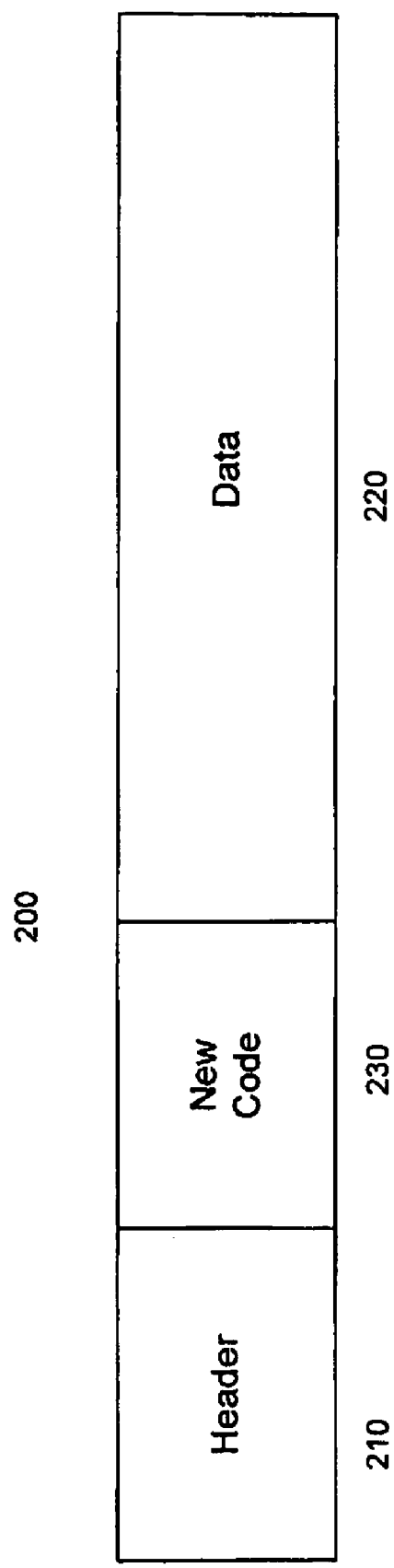
FIG. 2 is a diagram illustrating the configuration of an information packet in accordance with a possible embodiment of the invention

An exemplary information packet 200 is shown in FIG. 2. A conventional information packet 200 comprises three main components: a header 210, a data area 220, and a trailer (not shown here). The header 210 may include information for routing the packet from the source to its destination. The data area 220 may include the actual information that is being sent by the packet. The trailer may include information for handling the packet in case of errors. In active network systems, the information packet 200 may contain a code section.

The information packet 200 may also contain new code 230 that relates to a new metric that is not recognized by the system. Alternatively, new code 230 may be downloaded directly to the node 110 and stored there.

Once the new code enters the node 110, a new routing protocol is formed so that the new metric may be recognized by the node 110 and considered when computing routing information. For example, the routing protocol may form a new metric table in order to store information relating to the new metric. Upon entering the node 110, additional code 130 relating to a new metric may be inserted in the conventional information packet between the header 210 and the data area 220 to form the new information packet 200 used in accordance with the various embodiments of the invention.

For active networks, information may be inserted into the code section of the packet. For both traditional and active networks, this new information may then be incorporated into the node 110 that receives the information packet, and may even be stored internally on the node 100, or externally. The new code 230 may then cause a new routing protocol, or new portion of an existing routing protocol, to be formed at that node 110. The new protocol, or portion of protocol, may compute, or assist in computing, routing information based on the new metric. Information relating to the new metric may then be disseminated to other querying nodes 120 in order to update their metric information. In this way, the new code 230 inserted into an information packet 200 may allow the entire network 100 to adapt to a new metric. The results of computing the metric information with the new code 230 may be stored in a new table on the node 110, and/or may be incorporated into existing tables stored on the node 110.

Examples of these information packet metrics are known to those of skill in the art and may include, but are not limited to, hop-count, latency, bandwidth capacity, trust, residual energy, link stability, and geographical location. An information packet 200 may be routed based on a single selected metric or a plurality of selected metrics.

Computations of routing information as discussed herein are by any means that are known to one skilled in the art. A variety of computational algorithms may be applied to in order to compute routing information for an information packet. For example, routing information may be based on the number of hops the packet has taken, the number of hops it has until its destination, the amount of time since the packet has left the point of origination, or the amount of time left the packet has to reach its destination in order to meet the standards for the system. Routing information may be based on a combination of these factors, as well as other factors not listed herein.

Also as shown in FIG. 1, a computer readable medium 130, for example software applications, routing protocols, etc., may be stored on the node 110 or stored externally.

The figures and the related discussion herein are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks may be performed by remote processing devices that may be linked through a communications network. In a distributed computing environment, program modules may be located in both local and remote memory storage devices.

An exemplary system for implementing the invention may be a node 110, 120 which may be or include a general purpose computing device in the form of a conventional computer (not shown), and may include a processing unit (CPU), a system memory, and a system bus that couples various system components including the system memory to the processing unit. The system bus may be any of several types of bus structures including a memory bus or memory controller, a peripheral bus, and a local bus using any of a variety of bus architectures. The system memory may include read only memory (ROM) and random access memory (RAM). A basic input/output (BIOS), containing the basic routine that helps to transfer information between elements within the computer, such as during start-up, may be stored in the ROM. The computer may further include a hard disk drive for reading from and writing to a hard disk, a magnetic disk drive for reading from or writing to removable magnetic disk, and an optical disk drive for reading from or writing to a removable optical disk such as a CD ROM or other optical media. The hard disk drive, magnetic disk drive, and optical disk drive may be connected to the system bus by a hard disk drive interface, magnetic disk drive interface, and an optical drive interface, respectively. The drives and the associated computer-readable media provide nonvolatile storage of computer readable instructions, data structures, program modules and other data for the computer.

Although the exemplary environment described herein may employ a hard disk, removable magnetic disks and removable optical disks, it should be appreciated by those skilled in the art that other types of computer readable media which can be any available media that can be accessed by a general purpose or special purpose computer to store data and carry or contain computer-executable instructions or data structures stored thereon. By way of example, and not limitation, such computer-readable media can include magnetic cassettes, flash memory cards, digital video disks, Bernoulli cartridges, random access memories (RAMs) read only memory (ROM), EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that may be executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks may be performed by local and remote processing devices that may be linked (either by hardwired links, wireless links, or by a combination thereof) through a communications network. In a distributed computing environment, program modules may be located in both local and remote memory storage devices.

In the network 100, each node 110, 120 may maintain one or more tables relating to various routing information. New tables may be added on each selected node 110, 120 and/or the existing metric tables may be modified and updated when an information packet 200 containing updated information enters the node.

Figure 3:
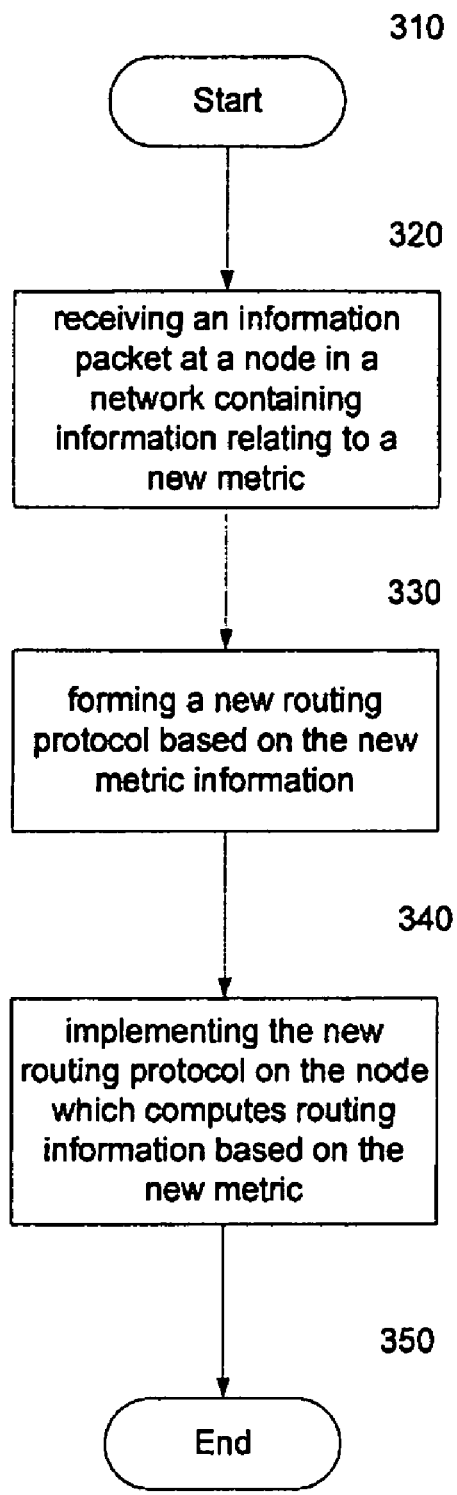
FIG. 3 is a flowchart of an exemplary information packet routing process in accordance with a possible embodiment of the invention.
Figure 4:
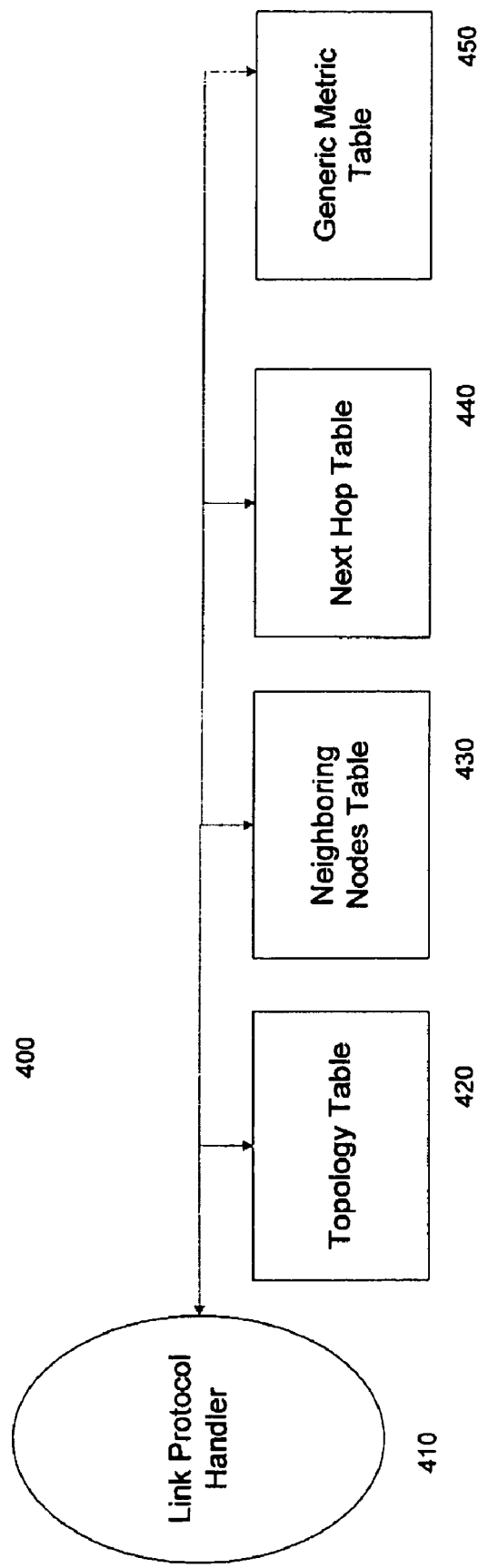
FIG. 4 is an exemplary diagram illustrating the responsibilities of a link property handler in accordance with a possible embodiment of the invention.

FIG. 3 is an exemplary flowchart illustrating a possible process of how the new metrics are used to implement the new routing protocol in the network 100. The node performing this process is called a link protocol handler 410, as shown in FIG. 4. Thus, the description of the exemplary process shown in the in FIG. 3 flowchart will reference the link protocol handler 410.

The process begins at step 310 and continues at step 320 when the node 110 in the network 100 serving as or containing the link protocol handler 410 receives an information packet 200 containing information relating to a new metric. At step 330, the link protocol handler 410 forms a new routing protocol based on the new metric information. At step 340, the link protocol handler 410

During this process, the link protocol handler 410 may also check the sequence number associated with link state tables contained in the information packet 200 and compare it to the sequence number of the link state tables at the node 110, for example. If the sequence number of the information packet 200 is larger than the node's 110 sequence number, then the node's 110 link state tables may be updated with the packet's link state tables and/or new tables may be added. Link state information may include, but is not limited to, a list of neighboring nodes, topology information, next-hop information, and a distance table including information relating to the shortest path, bandwidth and/or latency. The updated tables may then be disseminated to neighboring nodes 120, for example.

FIG. 4 shows a link protocol handler 410 which may use information stored in the metric tables to determine the best pathway for each information packet. The link protocol handler 410 may be any node, system or device in the network that may execute computer instructions, algorithms, or any other means capable of computing one or more metric. The link protocol handler 410 may determine routing information based on a number of factors. For example, information packet routing information may be based on data derived from at least one metric table, like the next hop table. Information packet routing information may also be based on data derived from more than one metric table. For example, calculations may be made using data from each metric table, and the link protocol handler 410 decides the final routing instructions based on these calculations. In this regard, any combination of metric tables may be used simultaneously when determining the pathway of an information packet.

Additionally, new metric tables may be added based on new metric information contained in the packet. This allows for the addition of new metric tables on the fly, and does not require the network to go inactive while adding or modifying metric tables. The link protocol handler 410 may simultaneously compute a metric by extending the standard routing protocols with additional data.

FIG. 4 also shows examples of tables maintained by the link property handler 310 in an embodiment of the present invention. A topology table 420 may comprise the link state information of the network, or local area of a network. The topology table 420 may also comprise a timestamp indicating the time which the data has been recorded. A neighboring nodes table 430 may comprise a list of nodes adjacent to that node. A next hop table 440 may comprise information relating to the next node that the information packet will be sent. A generic metric table 450 may comprise customizable information relating to each information packet. It should be noted that other tables not included in FIG. 4 may also be under the control of the link protocol handler 410. For example, the link protocol handler 410 may update and control the operation of a weighted distance table. The weighted distance table may comprise information relating to shortest path, bandwidth, and/or latency of the information packet and/or network.

In order to enable a node to recognize a new metric, a packet containing information relating to the new metric may be sent to the node. For example, new information may be sent to a node by a human operator. As further example, a node may automatically insert information relating to a new metric into an information packet when a predetermined event occurs. For example, when a new form of data (e.g., video, audio, VOIP, streaming or broadcast media, etc.) in the information packet is sent to a node, the node may insert a information relating to a new metric that reflects the new form of data being sent.

Generally, the routing protocol at the node manages messages that may be routed through that node. When a node receives information relating to a new metric from a packet, that information may be used by that node's routing protocol to form new code that computes link states and populates the metric tables. The new code may be implemented as or by the link protocol handler 410, as shown in FIG. 4. The link protocol handler 410 may take the form of a module stored on a machine readable medium that may be capable of computing link state information and populating existing and new metric tables. When the protocol handler 410 has incorporated information relating to a new metric, then control of the metric tables in FIG. 4 may transfer from the link protocol to the link protocol handler 410.

The link protocol handler 410 may compute a route based on the computation of one or more metrics simultaneously, and may populate the route information in the appropriate table. For example, the link protocol handler 410 may add or modify information in the generic metric table 450 and the next hop table 440. The metric tables in FIG. 4 may also be queried by other nodes in order for the querying nodes to update their metric tables. Additionally, new tables (not shown), relating to the new metric may be formed and placed under the control of the link protocol handler 410.

Extensions to routing protocols may be used by the link protocol handler 410 to simultaneously compute multiple metrics in the network prior to dissemination. A special cache for storage may be created and/or maintained by the link protocol handler 410 when handling multiple metrics.

Various network applications may install and choose a custom metric for routing of application packets in the network 100. Thus, network applications would be allowed to install a metric that is new, or unfamiliar, to the network 100. This allows for the network 100 to adapt to new types of data that may be sent over the network 100.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

The invention claimed is:

1. A method of routing information packets in a network using a routing protocol, comprising:
   receiving an information packet at a node in a network, wherein the information packet contains a plurality of metrics relating to a plurality of link state tables, wherein the plurality of metrics include at least two of hop-count, latency, bandwidth capacity, trust, residual energy, link stability, and geographical location;
   determining a sequence number associated with the plurality of link state table information contained in the information packet;
   determining if the sequence number associated with the plurality of link state table information contained in the information packet is larger than the sequence number associated with the plurality of link state table information at the node, wherein if it is determined that the sequence number associated with the plurality of link state table information contained in the information packet is larger than the sequence number associated with the plurality of link state table information at the node,
   updating a plurality of link state tables based on the metric information contained in the information packet, wherein the plurality of link state tables include at least two of a topology table, a next hop table, a neighboring nodes table, a generic metric table, and a weighed distance table;

computing routing information based on the plurality of updated link state tables; and routing packets in the network using the computed routing information.

2. The method of claim 1, wherein the node recognizes and extracts code from the information packet that comprises the plurality of metrics relating to the plurality of link state tables.

3. The method of claim 1, wherein the topology table includes link state information of the network.

4. The method of claim 1, wherein the next hop table includes information relating to the next node to which packets with be sent from the node.

5. The method of claim 1, wherein the generic metric table includes customizable information relating to each information packet.

6. The method of claim 1, wherein the weighted distance table includes information relating to at least one of shortest path, bandwidth, latency of the information packet, and latency of the network.

7. The method of claim 1, further comprising:
disseminating information relating to the updated link state tables to other nodes in the network.

8. A non transitory computer readable medium including instructions adapted to be executed by at least one processor to implement a method for routing information packets in a network using a routing protocol, the method comprising:

receiving an information packet at a node in a network, wherein the information packet contains a plurality of metrics relating to a plurality of link state tables, wherein the plurality of metrics include at least two of hop-count, latency, bandwidth capacity, trust, residual energy, link stability, and geographical location;

determining a sequence number associated with the plurality of link state table information contained in the information packet;

determining if the sequence number associated with the plurality of link state table information contained in the information packet is larger than the sequence number associated with the plurality of link state table information at the node, wherein if it is determined that the sequence number associated with the plurality of link state table information contained in the information packet is larger than the sequence number associated with the plurality of link state table information at the node, updating a plurality of link state tables based on the metric information contained in the information packet, wherein the plurality of link state tables include at least two of a topology table, a next hop table, a neighboring nodes table, a generic metric table, and a weighed distance table;

computing routing information based on the plurality of updated link state tables; and routing packets in the network using the computed routing information.

9. The non transitory computer readable medium of claim 8, wherein the node recognizes and extracts code from the information packet that comprises the plurality of metrics relating to the plurality of link state tables.

10. The non transitory computer readable medium of claim 8, wherein the topology table includes link state information of the network.

11. The non transitory computer readable medium of claim 8, wherein the next hop table includes information relating to the next node to which packets with be sent from the node.

12. The non transitory computer readable medium of claim 8, wherein the generic metric table includes customizable information relating to each information packet.

13. The non transitory method of claim 8, wherein the weighted distance table includes information relating to at least one of shortest path, bandwidth, latency of the information packet, and latency of the network.

14. The non transitory computer readable medium of claim 8, further comprising: disseminating information relating to the updated link state tables to other nodes in the network.

15. A node that routes information packets in a network using a routing protocol, comprising:

a link protocol handler that receives an information packet in the network, wherein the information packet contains a plurality of metrics relating to a plurality of link state tables, determines a sequence number associated with the plurality of link state table information contained in the information packet, determines if the sequence number associated with the plurality of link state table information contained in the information packet is larger than the sequence number associated with the plurality of link state table information at the node, wherein if the link protocol handler determines that the sequence number associated with the plurality of link state table information contained in the information packet is larger than the sequence number associated with the plurality of link state table information at the node, the link protocol handler updates a plurality of link state tables based on the metric information contained in the information packet, computes routing information based on the plurality of updated link state tables; and routes packets in the network using the computed routing information, wherein the plurality of metrics include at least two of hop-count, latency, bandwidth capacity, trust, residual energy, link stability, and geographical location, and the plurality of link state tables include at least two of a topology table, a next hop table, a neighboring nodes table, a generic metric table, and a weighed distance table.

16. The node of claim 15, wherein the link protocol handler disseminates information relating to the updated link state tables to other nodes in the network.

17. The node of claim 15, wherein the topology table includes link state information of the network.

18. The node of claim 15, wherein the next hop table includes information relating to the next node to which packets with be sent from the node.

19. The node of claim 15, wherein the generic metric table includes customizable information relating to each information packet.

20. The node of claim 15, wherein the weighted distance table includes information relating to at least one of shortest path, bandwidth, latency of the information packet, and latency of the network.

* * * * *